United States Patent [19]
Hisatomi et al.

[11] 3,987,131
[45] Oct. 19, 1976

[54] ALTITUDE CORRECTION DEVICE FOR A CARBURETOR AND CARBURETOR INCORPORATING THE SAME

[75] Inventors: Takashi Hisatomi; Chichitada Seki, both of Yokohama, Japan

[73] Assignee: Nissan Motor Co., Ltd., Japan

[22] Filed: May 15, 1974

[21] Appl. No.: 470,334

[30] Foreign Application Priority Data
Apr. 3, 1974    Japan.......................... 49-38052[U]
May 17, 1973   Japan............................... 48-54111

[52] U.S. Cl............................. 261/39 A; 261/69 R; 261/121 B
[51] Int. Cl.²......................................... F02M 1/10
[58] Field of Search.............. 261/39 A, 69 A, 121, 261/121 B; 236/99 D, 99 R; 73/410; 251/82, 83; 137/522

[56] References Cited
UNITED STATES PATENTS

| | | |
|---|---|---|
| 2,156,132 | 4/1939 | Thieulin............................ 261/39 A |
| 2,416,907 | 3/1947 | Chandler...................... 261/39 A X |
| 2,547,879 | 4/1951 | McGrath....................... 236/99 E X |
| 3,011,770 | 12/1961 | Stoltman........................... 261/39 A |
| 3,271,014 | 9/1966 | Wu................................ 261/69 AX |
| 3,810,606 | 5/1974 | Masaki............................. 261/39 A |
| 3,857,908 | 12/1974 | Brown et al. ..................... 261/39 A |
| 3,859,397 | 1/1975 | Tryon ............................... 261/39 A |

*Primary Examiner*—Tim R. Miles
*Assistant Examiner*—William Cuchlinski, Jr.
*Attorney, Agent, or Firm*—Robert E. Burns; Emmanuel J. Lobato; Bruce L. Adams

[57] ABSTRACT

Additional air is supplied to an air-fuel mixer of a main mixture circuit of a carburetor. Bellows and metering valve are arranged so that a lost motion is provided until a predetermined altitude. The bellows is mounted in a barometric chamber which is connected so that the ambient air entering the engine carburetor ventilates the barometric chamber.

6 Claims, 6 Drawing Figures

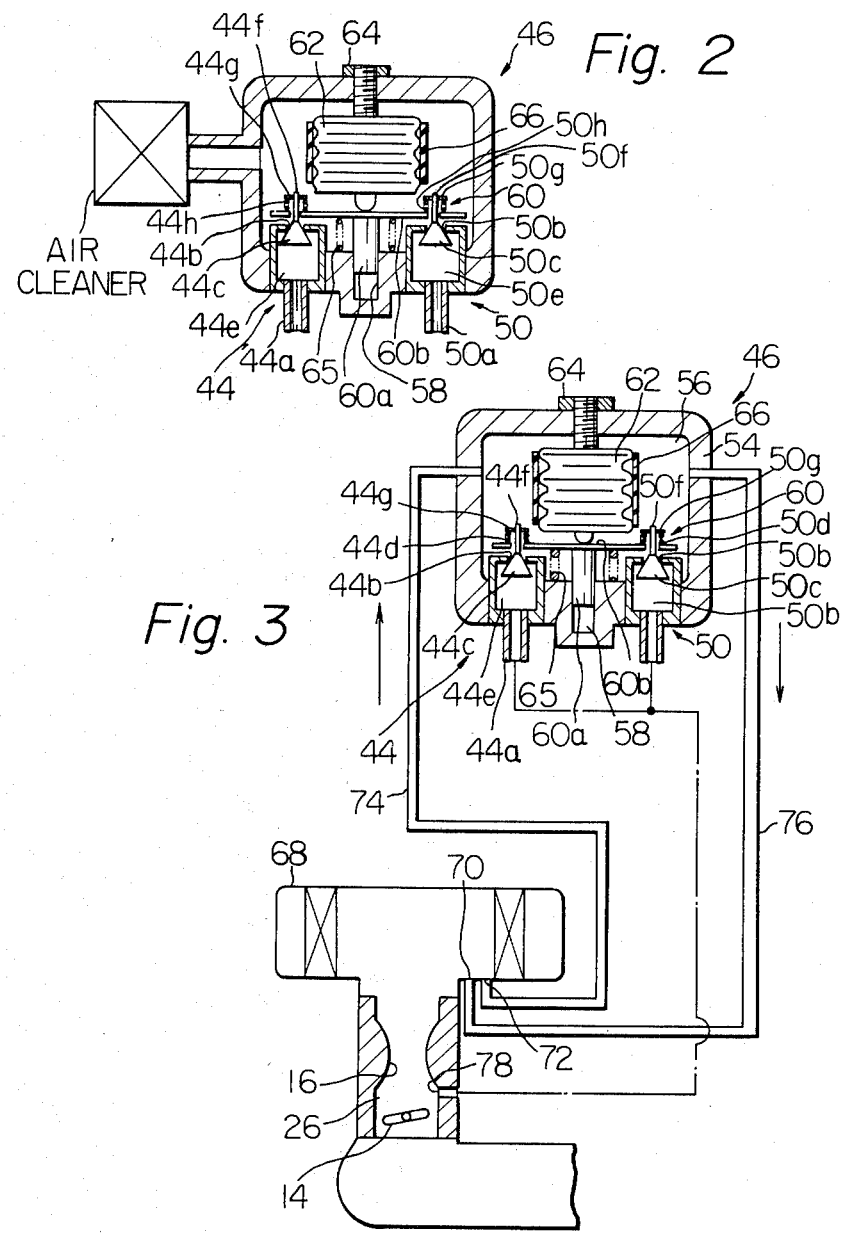

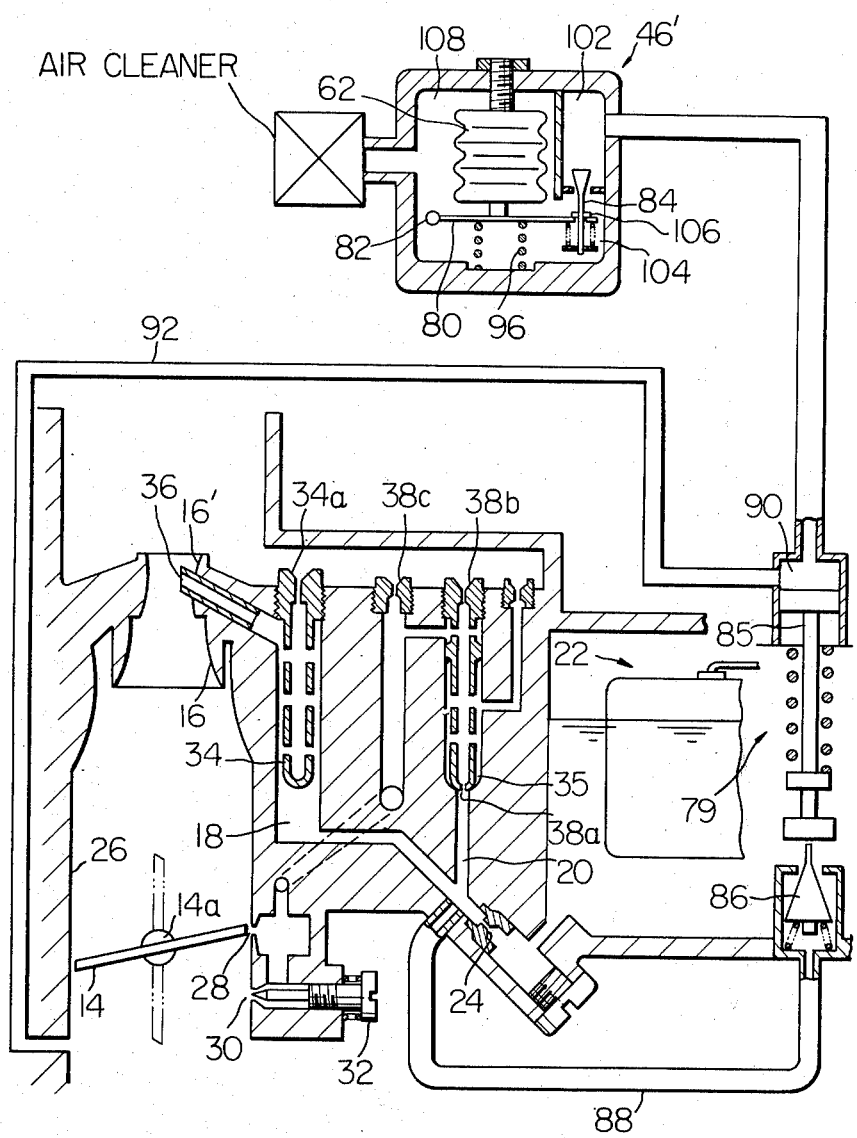

ALTITUDE CORRECTION DEVICE FOR A CARBURETOR AND CARBURETOR INCORPORATING THE SAME

BACKGROUND OF THE INVENTION

The present invention relates to an altitude correction device for carburetor of an automobile and a carburetor.

It is known that reducing the density of air taken into a carburetor causes a corresponding enrichment of the mixture. In the case of automobile engines, therefore, means have to be provided for maintaining the mixture strength or air-to-fuel ratio approximately constant as the altitude increases (and the air density decreases), otherwise engine operation including engine idling will be irratic and the concentration of the unburnt content in exhaust gas will increase. The present invention overcomes this problem by compensating for the reduction of air supplied to the carburetor.

SUMMARY OF THE INVENTION

It is an object of the present invention to provide an altitude correction device and a carburetor, for high altitudes, of an automobile intended to operate in mountainous areas.

It is a particular object of the present invention to provide an altitude correction device which is attachable to a conventional carburetor without extensive modification thereof.

It is still another object of the present invention to provide an altitude correction device which does not compensate for the reduction of barometric pressure on a carburetor when an automobile operates in only relatively hilly country.

It is still another object of the present invention to provide an altitude correction device which is uneffected by engine vibration.

It is still another object of the present invention to provide an altitude correction device which is uneffected by engine heat.

It is a further object of the present invention to provide a carburetor for high altitudes which should failsafe in that it will operate in flat country should the altitude correction device or conduit interconnecting the altitude correction device and the carburetor body fail.

BRIEF DESCRIPTION OF THE DRAWINGS

The other objects, features and advantages of the present invention will be more specifically described hereinafter in connection with the accompanying drawings, in which:

FIG. 2 is a schematic sectional view of a modified construction of an altitude correction device which is interchangeable with the altitude correction device illustrated in FIG. 1;

FIG. 3 is a schematic sectional view illustrating, in detail, a connection of an altitude correction device with an engine air cleaner and showing, in dot and dash lines, another air intake port for altitude correction;

FIG. 4 is a schematic sectional overall view of a carburetor provided with a power bypass valve to which is connected another modified altitude correction device.

DESCRIPTION OF THE PREFERRED EMBODIMENTS

Figure 1:
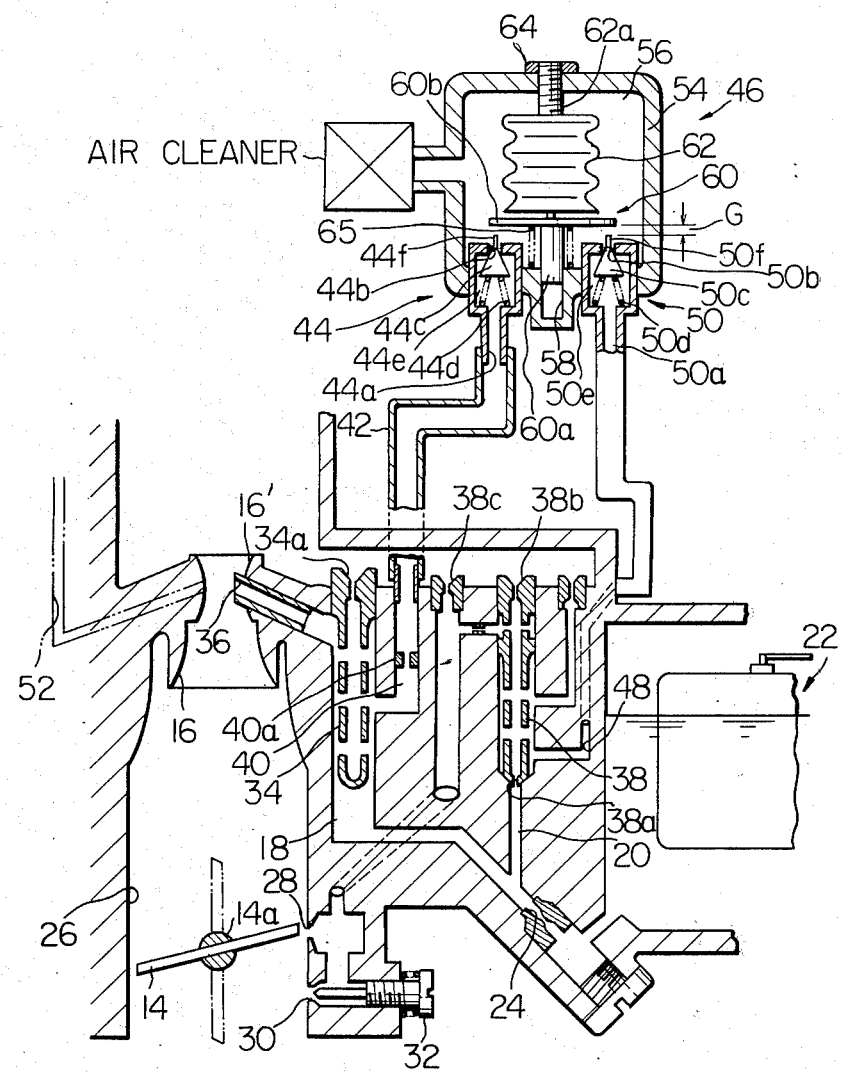
FIG. 1 is a schematic sectional overall view of a carburetor incorporating an altitude correction device.

Throughout the accompanying drawings, like characters and reference numerals designate corresponding parts or elements.

A carburetor shown in FIG. 1 supplies an air-fuel mixture to an internal combustion engine of a motor vehicle. The carburetor is provided with a throttle valve 14, a main venturi 16, a secondary venturi 16', a main mixture circuit 18, an idling and slow-running mixture circuit 20 and a float chamber 22 constituting a fuel supply reservoir. The mixture circuits 18 and 20 communicate through a fuel jet 24 with the float chamber 22. The throttle valve 14 is mounted on a rotatable shaft 14a in carburetor induction passage 26 and is herein shown as substantially closed to effect idling of the engine or deceleration of the motor vehicle. The main mixture circuit 18, through which an air-fuel mixture is supplied to the carburetor induction passage 26 for relatively heavy load operation such as acceleration or high speed driving of the engine, opens into the secondary venturi 16'. The idling and slow-running mixture circuit 20 for idle or light load operation opens to the carburetor induction passage 26 through a slow-running port 28 and an idling port 30. The slow-running port 28 is located at a position closely adjacent to the periphery of the throttle valve 14 when it is substantially fully closed, while the idling port 30 is located downstream of the throttle valve 14. Designated by numeral 32 is an idling adjustment screw for adjusting the flow rate of the mixture through the idling port 30.

There is provided in the main mixture circuit 18, a main fuel and air mixer or emulsion tube 34 and a main nozzle 36. The main fuel and air mixer 34 has formed at its top an air bleed 34a.

In operation, with the throttle valve 14 substantially fully opened (the position of imaginary lines) for a relatively heavy load operation, a high vacuum is established in the secondary venturi 16' due to the fact that air is passing through it at a considerable rate during this particular operation. Then, fuel is metered by the main jet 24 and is mixed with air in the main mixer 34 to provide an air-fuel mixture, which is drawn through the main nozzle 36 into the secondary venturi 16' by the vacuum established therein.

There is provided in the idling and slow-running mixture circuit 20 a slow-running fuel and air mixer 38 which has formed at its bottom an orifice 38a and communicates with a first air bleed 38b. Downstream of the first air bleed 38b a second air bleed 38c is provided. The first and second air bleeds 38b and 38c respectively, are so calibrated as to admit air from the ambient atmosphere at metered flow rates. While the engine under idling or light load conditions and the throttle valve 14 substantially closed, the flow rate of air delivered into the engine is not large and, therefore, a high vacuum is not established in the secondary venturi 16'. Thus, a metered air-fuel mixture is supplied to the engine through the slow-running port 28 and/or the idling port 30.

The carburetor described above is well known in the art and is provided with an additional air admission passage 40 which at its bottom communicates with the main fuel air mixer 34 at a location upstream of the main nozzle 36 and has at its top a coupling portion (no numeral) to which the air admission passage 40 is connected by a conduit 42 with an outlet 44a of a valve unit 44 of an altitude correction device generally designated by a reference numeral 46. If a corresponding enrichment of the mixture due to the effect of reducing the density of air through a carburetor causes irratic idling and slow-running operations, it is necessary to provide the carburetor shown in FIG. 1 a second additional air admission passage 48 which communicates with the fuel and air mixer 38 at a location upstream of first air bleed 38b and communicates with a second outlet 50a of a second valve unit 50 of the altitude correction device 46. It is also possible to provide, instead of the additional air admission passage 40 and 48, only one passage 52 which opens to the secondary venturi 16' (indicated by imaginary lines) and which communicates with the outlet 44a or which may communicate with the outlets 44a and 50a of the altitude correction device 46.

The altitude correction device 46 will now be described in detail. The altitude correction device 46 shown in FIG. 1 comprises a housing 54 the interior of which opens to the ambient air via an air cleaner, the preferable connection between the air cleaner and the housing 54 being more fully described hereinafter in connection with FIG. 3. Designated by a reference numeral 56 is an atmospheric or barometric chamber open to the ambient atmosphere. The valve unit 44 has a valve seat 44b, which is normally sealed by a valve head 44c, which is biased by a valve spring 44d disposed within a valve chamber 44e. Likewise, the valve unit 50 has a valve seat 50b, which is normally closed by a valve head 50c which is also biased by a valve spring 50d disposed within a valve chamber 50e. The valve heads 44c and 50c are arranged to close the associated valve seats 44b and 50b respectively to block the additional air admission passages 40 and 48 while motor vehicle operates at sea-level or altitudes at which the reduction of density of air would not cause considerable enrichment of air-fuel mixture. The housing 54 is provided with a pilot or guide bore 58 into which a slider 60a of a valve actuator 60 is guidedly slidable, the slider 60a being fixed to a valve tappet 60b which is arranged to actuate the valve heads 44c and 50c. The valve actuator 60 is moved by a bellows 62 toward valve stems 44f and 50f to move the valve head 44c and 50c to open flow communication between the atmospheric chamber 56 and the valve chambers 44e and 50e via the associated valve seats 44b and 50b respectively.

The bellows 62 is mounted within the atmospheric or barometric chamber 56 and retained at its one end by a retainer member 62a which is adjustable toward and away from the valve actuator 60 by an adjustment means 64. The other end is fixed to the valve actuator 60 in such a manner that the movement of the bellows 62 due to its extension and contraction causes a corresponding movement of the valve actuator 60. A return spring 65 is provided to act on the valve actuator 60 to bias the bellows 62 toward its contracted condition. The bellows 62 should be filled with nitrogen gas in its normal state under atmospheric pressure at sea level (or alcohol used in alcohol thermometer under atmospheric pressure at sea level).

It will now be understood that the bellows 62 extends against the action of return spring 65 as the air density of the ambient atmosphere reduces.

The return spring 65 in the construction of the altitude correction device 46 serves to prevent vibration of the valve tappet 60b induced directly and/or indirectly by the engine vibration. It will also be noted that since the bellows 62 is securely fixed to the valve actuator 60 which is guidedly disposed in the pilot bore 58, the bellows 62 is thus prevented from being vibrated by the engine vibration.

A clearance G between the valve tappet 60b and the valve stems 44f and 50f should be provided and have such a distance that will prevent the valves from opening until the altitude reaches a predetermined altitude such as 500m above the sea level. This clearance designated by G can be adjusted by the adjustment means 64. It will be appreciated therefore that with the provision of clearance G the malfunction of the valves 44 and 50 would be prevented, should the valve tappet 60b vibrate.

In operation, when a motor vehicle is operating at altitudes lower than 500m, the valves 44 and 50 are in the illustrated position and remain closed. The predetermined altitude of 500m above the sea level is desirable because the effect of reduction of air density below this level on the engine is negligible.

When the motor vehicle is operating at altitudes above the predetermined altitude, the reduction of barometric pressure causes the valves 44 and 50 gradually permit the supply of additional air to the main mixture circuit 18 and the idle and slow-running mixture circuit 20 to compensate for the effect of reduction of density of air on mixture strength.

The housing 54 of the altitude correction device 26 is usually fixed securely to a dash panel (not shown) of a motor vehicle engine room (not shown) with its outlet 44a connected to coupling portion of the additional air admission passage 40 by the conduit 42, such as a rubber hose. The carburetor should fail-safe in that it can operate should the rubber hose 42 be broken or uncoupled. To this end there is provided a fail safe orifice or jet 40a (see FIG. 7). With the orifice 40a the motor vehicle could be driven at around the sea level, should the admission passage be exposed directly to the ambient atmosphere. The diameter of the orifice 40a should be so selectd as to provide air-to-fuel ratio of between 17 and 18 if the engine is operated under the sea level with the altitude correction device removed.

If there is no effect of higher altitudes on the mixture strength during idling, altitude correction for the idling and slow-running mixture circuit can be eliminated.

FIG. 2 illustrates a modified altitude correction device. In this device to actuate each valve head to open the associated valve seat after the valve actuator has moved against the action of the return spring beyond a predetermined distance, the valve stems 44f and 50f are provided with valve retainers 44g and 50g and compression springs 44h and 50h disposed in compression between the retainers and the valve tappet 60b to bias the valve heads 44c and 50c toward their closed position. To restrain vibration of bellows 62 a rubber sleeve 66 is so coupled as to surround the bellows 62 in case that the bellows 62 is not fixed to this valve actuator but abuts on the valve actuator 60.

The housing of an altitude correction device illustrated in FIG. 1 or FIG. 2 is preferably connected with an engine air cleaner as illustrated in FIG. 3.

Designated by a reference numeral 68 is an air cleaner mounted upstream of the induction passage 26 of a carburetor. The air cleaner has a first location 70 and a second location 72 across which relatively large pressure difference occurs during the operation of engine. Conduits 74 and 76 connecting the housing 54, with the first and the second portions 70 and 72 for ventilation of the atmospheric chamber 56 so that the effect of the heat from the engine compartment on the bellows 62 will be reduced because the temperature in the atmospheric chamber 56 is substantially the same as that in the air cleaner 68. Thus reliability of operation is increased.

As shown in imaginary lines in FIG. 3 the altitude correction device may be connected to an additional air admission port 78 opening to the induction passage 26 located downstream of a venturi 16.

Referring to FIG. 4, there is shown a carburetor provided with a power bypass valve 79 and a still further modified construction of an altitude correction device suitable for altitude correction of the power bypass valve. In the altitude correction device shown in FIG. 4, a pilot lever 80 is provided on a fixed pivot pin 82 to actuate a needle valve 84 in response to the movement of bellows 62. The needle valve 84 is mounted on the lever 80 by a compression spring 104 and a stop 106 preventing the valve 84 from downward movement due to the biasing force of the compression spring 104. The needle valve 84 is biased to an open position by a spring 96.

The power bypass valve 79 comprises a suction piston 85 to close a normally open valve 86 provided in a bypass fuel supply line 88 leading from the float chamber 22 to a location downstream of the main jet 24. The suction piston 85 is movable responsive to the magnitude of vacuum created in a suction chamber 90 opening to the induction passage downstream of the throttle valve through a vacuum conduit 92.

The suction chamber 90 is connected to valve chamber 102 of the altitude correction device 46' which communicates with barometric chamber 108 by the normally open valve 84 on the pivot lever 80 biased by spring 96.

In operation, the suction piston 85 maintains the valve 86 to the open position (the illustrated position) to allow fuel into the main mixture circuit 18 when the carburetor operates on a relatively low altitude area, because the suction chamber is vented from the ambient atmosphere through the normally open valve 84.

When the vehicle operates at high altitudes the bellows 62 urges the valve 84 to closed position to restrict additional air flow into the suction chamber 90, thereby to increase the vacuum therein. The increase of the vacuum in the suction chamber 90 causes the suction piston to restrict fuel supply by the fuel bypass line 88. Thus it will be noted that the effect of altitude is compensated for by reducing fuel supply to mixture circuits 18 and 20.

Figure 5A:
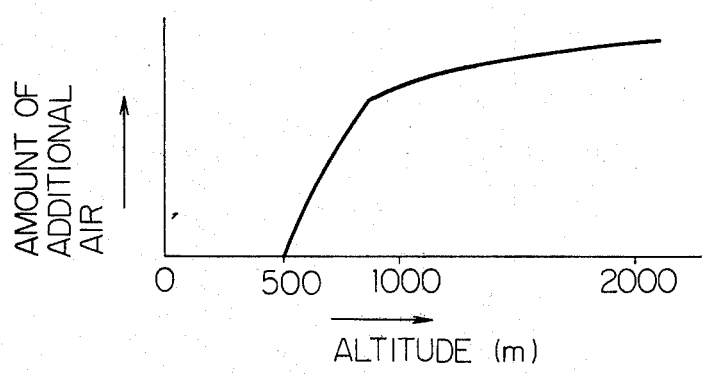
FIGS. 5(A) and 5(B) are graphical representations of the effect of altitude on a carburetor.
Figure 5B:
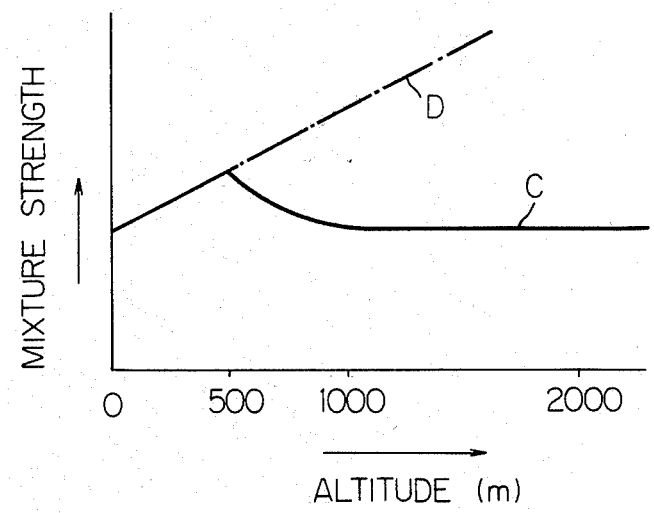

FIG. 5(A) illustrates the amount of additional air delivered to a main mixture circuit as the altitude increases. It will be noted that before the altitude reaches 500m no additional air is delivered to the main mixture circuit. FIG. 5(B) illustrates the relation between mixture strength and the altitude (see curve C). Line D represents the mixture strength without the altitude correction.

Although in the preceding description a one barrel carburetor is exemplified to explain the location of additional air admission ports or passages, it will be noted that such additional air admission ports should be provided to communicate with all mixture supply circuits which are effected by the reduction of air density. In case of a two-stage carburetor a main mixture circuit is effected by the reduction of air density, thus such an air admission port should be provided to open to the main mixture circuit. However, if desired, additional air may be supplied to both main and slow mixture circuits.

What is claimed is:

1. An altitude correction device for a carburetor, comprising: a housing having an atmospheric chamber; a valve unit having a valve chamber with a port communicating with the atmospheric chamber; a valve to close the port; a valve actuator slidably disposed in said housing to actuate said valve; a bellows mounted within the atmospheric chamber to move said valve actuator; a return spring acting on said valve actuator to bias said bellows toward a contracted condition; a valve spring biasing said valve toward its closed position; said valve actuator, said valve and said valve spring being arranged in said housing so that said valve is actuated by said valve actuator to open the port after said valve actuator has moved against the action of said return spring beyond a predetermined distance;

said valve spring being positioned in the valve chamber and said valve having a valve stem engageable with said valve actuator; said bellows abutting said valve actuator; and a rubber sleeve coupled with said bellows.

2. An altitude correction device for a carburetor, comprising: a housing having an atmospheric chamber; a valve unit having a valve chamber having a port communicating with the atmospheric chamber; a valve to close the port; a valve actuator slidably disposed in said housing to actuate said valve; a bellows mounted within the atmospheric chamber to move said valve actuator; a return spring acting on said valve actuator to bias said bellows toward a contracted condition; a valve spring biasing said valve toward its closed position; said valve actuator, said valve and said valve spring being arranged in said housing so that said valve is actuated by said valve actuator to open the port after said valve actuator has moved against the action of said return spring beyond a predetermined distance;

said valve having a valve stem provided with a retainer; and said valve spring being compressibly disposed between said valve actuator and said retainer.

3. An altitude correction device as claimed in claim 2, in which said bellows is fixed to said valve actuator.

4. An altitude correction device as claimed in claim 2, in which said bellows abuts said valve actuator, and including a rubber sleeve coupled with said bellows.

5.

In a carburetor for high altitudes having an induction passage, a main mixture circuit and an idling and slow-running mixture circuit;

means defining an additional air admission passage communicating with the induction passage;

a housing having an atmospheric chamber;

a valve unit having a valve chamber having a port communicating with the atmospheric chamber, said valve chamber communicating with said additional air admission passage;

a valve to close the port;

a valve actuator mounted on said housing to actuate said valve;

a bellows mounted within the atmospheric chamber to move said valve actuator;

an air cleaner mounted upstream of said induction passage and having a first and a second location across which a pressure difference will occur during operation of the carburetor;

and conduit means connecting said housing, the first and the second portions for establishing ventilation air flow in the atmospheric chamber.

6. In a carburetor having:

an induction passage;

a main mixture circuit communicating with said induction passage and including a fuel and air mixer;

an idling and slow-running mixture circuit communicating with said induction passage and including a fuel and air mixer;

a housing having an atmospheric chamber;

a first valve unit having a valve chamber communicating with the fuel and air mixer of said main mixture circuit and being communicable with the atmospheric chamber, said first valve unit having a normally closed valve for closing communication between the valve chamber and the atmospheric chamber;

a second valve unit having a valve chamber communicating with the fuel and air mixer of said idling and slow-running mixture circuit and being communicable with the atmospheric chamber, said second valve unit having a normally closed valve for closing communication between the valve chamber of said second valve unit and the atmospheric chamber;

a valve actuator mounted within the atmospheric chamber;

a bellows mounted within the atmospheric chamber to move said valve actuator; and a return spring acting on said valve actuator to bias said bellows toward its contracted position;

the normally closed valves of said first and second valve units are constructed and arranged so that said valves are actuated to be opened by said valve actuator after said valve actuator has moved against the action of said return spring beyond a predetermined distance.

* * * * *